(12) United States Patent
Merrill et al.

(10) Patent No.: US 7,704,364 B2
(45) Date of Patent: Apr. 27, 2010

(54) FULL WAVE RECTIFIED POWER WATER TREATMENT DEVICE

(75) Inventors: Richard P. Merrill, Columbia, MD (US); John W. Lane, Finksburg, MD (US)

(73) Assignee: Evapco, Inc., Taneytown, MD (US)

( * ) Notice: Subject to any disclaimer, the term of this patent is extended or adjusted under 35 U.S.C. 154(b) by 1233 days.

(21) Appl. No.: 11/248,776

(22) Filed: Oct. 11, 2005

(65) Prior Publication Data

US 2007/0080588 A1    Apr. 12, 2007

(51) Int. Cl.
*C02F 1/48* (2006.01)
(52) U.S. Cl. .................. 204/660; 204/664; 204/666
(58) Field of Classification Search ............ 204/660, 204/664, 666
See application file for complete search history.

(56) References Cited

U.S. PATENT DOCUMENTS

| | | |
|---|---|---|
| 4,938,875 A | 7/1990 | Niessen |
| 5,702,600 A | 12/1997 | Pandolfo |
| 6,063,287 A | 5/2000 | Smith et al. |
| 6,146,526 A | 11/2000 | Pandolfo |
| 6,203,710 B1 * | 3/2001 | Woodbridge ................ 210/695 |
| 7,524,423 B2 * | 4/2009 | Wittmer et al. ............. 210/748 |

* cited by examiner

*Primary Examiner*—Arun S Phasge
(74) *Attorney, Agent, or Firm*—Morrison & Foerster LLP

(57) ABSTRACT

A fluid treatment device includes an AC power source connected to first, second and third conductors. A electromagnetic field generating device is positioned adjacent to a fluid conduit, electrically connected to the first and third conductors to form a first circuit. A second electromagnetic field generating device is positioned adjacent to a second fluid conduit, electrically connected to the second and third electrical conductors to form a second circuit. A circuit element in the first circuit initiates a high frequency electromagnetic field at said first electromagnetic field generating device during a first half of the AC wave form in the first circuit, and a circuit element in the second circuit initiates a high frequency electromagnetic field at said first electromagnetic field generating device during a second half of the AC wave form in the second circuit.

29 Claims, 4 Drawing Sheets

FULL WAVE RECTIFIED POWER WATER TREATMENT DEVICE

BACKGROUND OF THE INVENTION

The present invention relates to devices for treating fluids, such as water, and more particularly, to fluid treatment devices which are powered to provide electrical and magnetic fields in the fluid.

Fluid treatment with DC-powered solenoid coils has been used for many years. Such an arrangement is shown in U.S. Pat. No. 4,938,875. The DC power can be provided by a DC source (battery) or a rectified AC source. For example, U.S. Pat. Nos. 5,702,600; 6,063,287 and 6,146,526 have modified the AC method by using only a rectified half-wave to generate the DC power (without a smoothing power capacitor) and letting the coils ring with the current closed off for the second half wave. During the no-current period, the coils will ring at their resonant frequency (which can be modified by the addition of a small amount of capacitance) and emit a high frequency field into the fluid to be treated. In the '600 patent, a diode is used to rectify the wave and in the '287 patent, a triode is used to rectify the wave.

Use of a rectified (half wave) AC current for providing the DC power is inefficient, decreases the life of the transformer used in such circuits, and results in an unfavorable power factor.

While the first half wave is used in an almost purely inductive load in the coils, creating electromagnetic fields in the fluid, the second half wave is not used at all. This creates an inefficient and unbalanced load on the transformer.

Since only half of the wave is used, the transformer continually runs at magnetic saturation rather than operating in its design region. Operating a transformer at saturation will result in increase eddy current losses and hysteresis losses. The combination of excess heat generation and operating at magnetic saturation significantly reduces efficiency and negatively affects transformer life.

While the '600 and '287 patents further describe using a full wave rectifier to power the coils, such an arrangement also has problems. With full wave rectification, the coil ring is limited by the other half of the AC cycle. Devices built using this design will have a weak and truncated ring.

It would be an advance in the art if a fluid treatment device were provided that addressed the above described problems.

SUMMARY OF THE INVENTION

The present invention provides a fluid treatment device with an arrangement for using a fully rectified wave to power two matched, independent sets of coils, with each set using only one half of the AC wave. Each set of coils will fully ring at its resonant frequency and the full AC primary power is used to generate the electromagnetic fields. This invention doubles the efficiency of the device, improves transformer life, and improves the utility power factor, while maintaining the desired ringing fields.

In an embodiment, the coils are matched such that the current flowing through each set of coils is approximately equal.

In an embodiment, a fluid treatment device is provided which may be connected to a source of AC power having a maximum voltage. A transformer is connected to the source of AC power at a primary transformer coil to provide an alternating current flow at a secondary transformer coil, which may have a lower maximum voltage, a higher maximum voltage or the same maximum voltage as at the primary transformer coil. A first electrical conductor is electrically connected to a first point on the secondary coil. A second electrical conductor is electrically connected to a second point on the secondary coil spaced from the first point. A third electrical conductor is electrically connected to a third point on the secondary coil intermediate the first and second points. A first coil is wrapped around a first fluid conduit and is electrically connected to the first and third electrical conductors to form a first circuit. A second coil is wrapped around a second fluid conduit and is electrically connected to the second and third electrical conductors to form a second circuit.

A first circuit element is provided in the first circuit to allow passage of current in a first direction in the circuit and to substantially prevent passage of current in a second direction in the first circuit, and a second circuit element in the second circuit to allow passage of current in the second direction in the circuit and to substantially prevent passage of current in the first direction in the second circuit.

These and other features and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENT

The present invention relates to fluid treatment devices which can be used in a wide variety of applications. In an embodiment, the fluid treatment device could be used in an environment such as an evaporative cooler in which water is recirculated through the cooler, and is subject to scaling and developing microorganisms. Other types of environments are contemplated for use of this device as well, such as heating systems. In order to provide a description of an embodiment of the invention, the fluid treatment device is discussed in terms of being used with one or more fluid conduits, it being understood that the conduits could be used to carry heating or cooling water, or other fluids, as desired.

Figure 1:
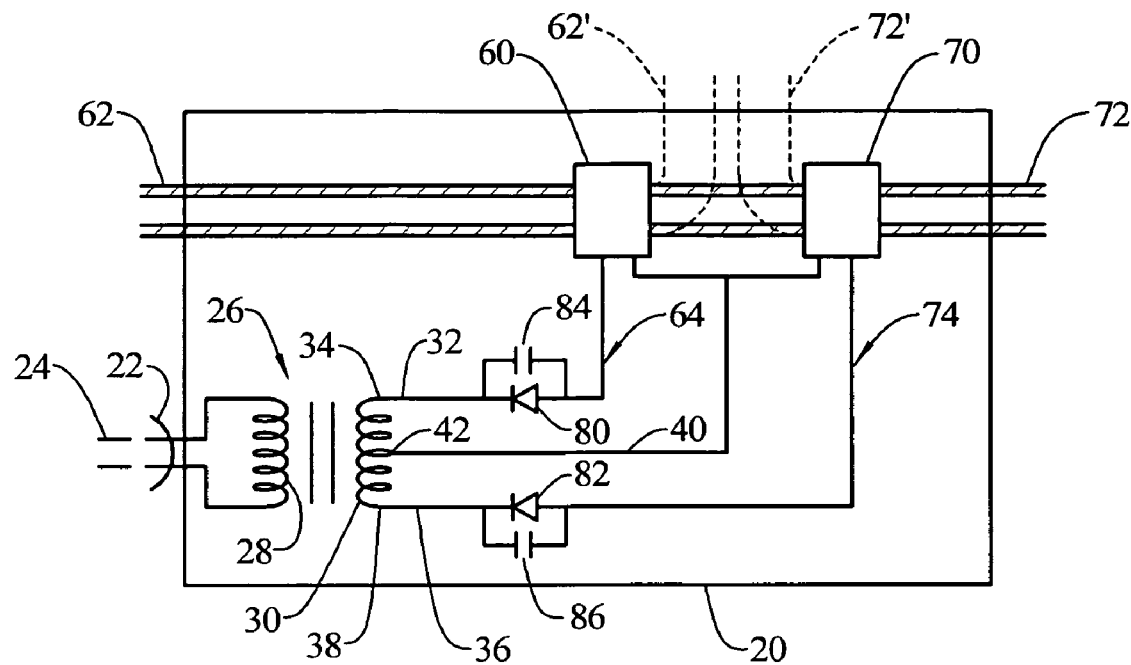
FIG. 1 is a schematic electrical diagram of an embodiment of the invention.

As illustrated schematically in FIG. 1, a fluid treatment device 20 is provided for being connected via a plug 22 or other electrical connection, such as a direct hard wired connection, to a source of AC power 24 having a maximum voltage. The source of AC power might typically be an electrical line supplied by a power company, in which the voltage supplied oscillates between a maximum positive voltage and a maximum negative voltage, with an alternating current. Usually in the United States, power companies supply alternating current electricity which alternates at a rate of 60 times per second, and in Europe and other parts of the world, power is supplied at an alternating current rate of 50 times per second. The present invention is contemplated to be able to operate at either of these rates, or other alternating rates that may be provided by various types of power supply devices or other electrical devices.

The fluid treatment device 20 includes a transformer 26 connected to the source of AC power 24 at a primary transformer coil 28 to provide an alternating current flow at a secondary transformer coil 30 which may have a lower maximum voltage, a higher maximum voltage or the same maximum voltage as at the primary transformer coil. A first electrical conductor 32 is electrically connected to a first point 34 on the secondary coil 30. A second electrical conductor 36 is electrically connected to a second point 38 on the secondary coil 30 spaced from the first point 34. A third electrical conductor 40 is electrically connected to a third point 42 on the secondary coil 30 intermediate the first 34 and second 38 points.

In an embodiment, the first point 34 may be located near a first end of the secondary coil 30.

In an embodiment, the second point 38 may be located near a second end of the secondary coil 30.

In an embodiment, the third point 42 may be located near a middle of the secondary coil 30.

In an embodiment, the third point may be substantially half way between the first 34 and second 38 points.

In an embodiment, the first 34, second 38 and third 42 points may be arranged such that substantially identical current flow and substantially identical lower maximum voltage is provided in the first 64 and second 74 circuits. In other embodiments, varying relative levels of current and voltage may be provided in the first 64 and second 74 circuits so that resulting electric and magnetic fields are obtained at desired magnitudes.

As schematically illustrated in FIG. 1, a first coil 60 formed from current carrying wire is wrapped around a first fluid conduit 62 and is electrically connected to the first 32 and third 40 electrical conductors to form a first circuit 64.

A second coil 70 formed from current carrying wire is wrapped around a second fluid conduit 72 and is electrically connected to the second 36 and third 40 electrical conductors to form a second circuit 74. The second fluid conduit 72 may be separate and distinct from the first fluid conduit 62 as indicated by the phantom lines 62' and 72', or the two conduits may be one in the same. In this way, a single fluid treatment device 20 may be used to treat two fluid circuits at the same time, each circuit being provided with the same power and field level as with previously available fluid treatment devices, while using the size of fluid treatment device previously used for treating a single circuit. Further, the transformer will operate more efficiently and the power factor will be higher, thereby reducing the strain on the power utility distribution system.

If this fluid treatment device 20 is used to treat a single fluid circuit, then a smaller sized fluid treatment device may be used to treat the fluid flowing through the single circuit than previously used, since electromagnetic fields are being applied to the fluid at each reversal of the current flow, rather than at every second reversal of the current flow.

FIG. 1 further shows a first circuit element 80 provided in the first circuit 64 to allow passage of current in a first direction (for example, counterclockwise) in the first circuit and to substantially prevent passage of current in a second, opposite direction (for example, clockwise) in the first circuit. In an embodiment, the first circuit element 80 may be a rectifier, such as a diode. The first circuit element 80 may also be another type of rectifier device, such as a triode, a switch arranged to open or close based on a zero (or other voltage) crossing of the current (including microprocessor controlled switches), or other known types of circuit devices. The use of such a first circuit element 80 causes the first coil 60 to ring at a relatively high frequency, providing the benefits of treating the fluid in the conduit 62 as described in U.S. Pat. Nos. 5,702,600; 6,063,287 and 6,146,526, the disclosures of which are incorporated herein by reference.

A second circuit element 82 is provided in the second circuit 74 to allow passage of current in the second direction in the second circuit and to substantially prevent passage of current in the first direction in the second circuit. In an embodiment, the second circuit element 82 may be a rectifier, such as a diode. The second circuit element 82 may also be another type of rectifier device, such as a triodes, a switch arranged to open or close based on a zero (or other voltage) crossing of the current (including microprocessor controlled switches), or other known types of circuit devices. The second circuit element 82 provides the same ringing result of the second coil 70 as the first circuit element 80 provides for the first coil 60.

In various embodiments, the first coil 60 may be spaced from the second coil 70 on the first fluid conduit 62, the first coil 60 may abut the second coil 70 on the first fluid conduit 62, or the second coil 70 may at least partially overlap the first coil 60 on the first fluid conduit 62. If the magnetic field of one coil is intended to interact with the magnetic field generated by the other coil, then any gap between the two coils should be limited to no more than about 1.25 cm (0.5 inches) in a typical coil wrapped on a 5 cm (2 inch) diameter conduit.

In an embodiment, the first coil 60 may be wired such that current flows in a first circumferential direction around the first fluid conduit 62 and the second coil 70 may be wired such that current flows in a second, opposite circumferential direction around the first fluid conduit. Alternatively, the first coil 60 may be wired such that current flows in the first circumferential direction around the first fluid conduit 62 and the second coil 70 may also be wired such that current flows in the first circumferential direction around the first fluid conduit.

In an embodiment, the first coil 60 may be wrapped around the first fluid conduit 62 in a first direction and the second coil 70 may also be wrapped around the second fluid conduit 72 in the first direction. In an alternate embodiment, the first coil 60 may be wrapped around the first fluid conduit 62 in the first direction and the second coil 70 may be wrapped around the second fluid conduit 72 in a second, opposite direction.

FIG. 1 illustrates that in an embodiment, the first circuit 64 may include a capacitor 84 connected in parallel with the first circuit element 80. Such a capacitor may include any type of capacitive device that can be used to store electrical charge. The size or capacity of the capacitor 84 can be selected to have a desired effect on changing the ringing frequency of the first coil 60.

In an embodiment, the second circuit 74 may also include a capacitor 86 connected in parallel with the second circuit element 82. Such a capacitor may be similar to capacitor 84 which may be used in the first circuit 64.

The wiring and wrapping of the coils 60 and 70 may be selected to generate electromagnetic fields in the conduits 62 and 72, as selected. For example, the first coil 60 may generate a first electromagnetic field in a first direction and the second coil 70 may generate a second electromagnetic field in a second direction opposite the first direction. Alternatively, the first coil 60 may generate a first electromagnetic field in the first direction and the second coil 70 may also generate a second electromagnetic field in the first direction. In this manner, if the coils are arranged in close proximity on the same fluid conduit, they may provide opposed or bucking fields, or they may provide fields that are additive or complement one another.

Figure 2:
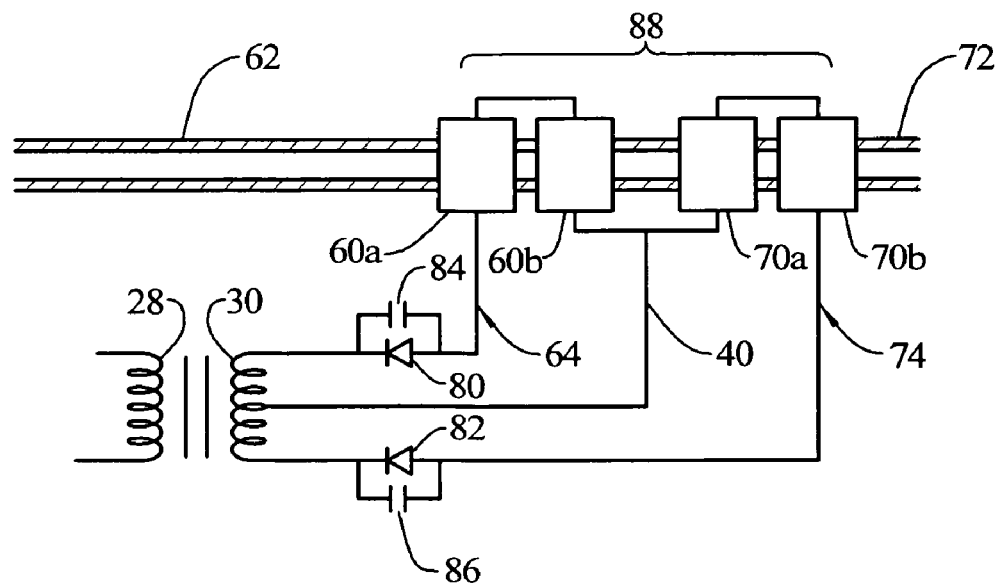
FIG. 2 is a schematic electrical diagram of a second embodiment of the invention.

In some embodiments, the coils may be formed in two or more segments or parts, such that two or more separate coils will be provided for either the first circuit 64 or the second circuit 74 or both. In an embodiment, as illustrated in FIG. 2, the first coil 60 is formed in a first part 60a and a second part 60b on the first fluid conduit 62. The first coil 60 could also be provided in more than two parts. FIG. 2 also illustrates the second coil 70 as being formed in a first part 70a and a second part 70b.

With each coil being formed in more than one part, such as in two parts, various options for winding and wiring the separate parts of each coil. For example, the first part 60a may be wound in a first direction around the first fluid conduit 62 and the second part 60b may also be wound in the first direction around the first fluid conduit. Alternatively, the first part 60a may be wound in the first direction around the first fluid conduit 62 and the second part 60b may be wound in a second, opposite direction around the first fluid conduit.

Also, the first part 60a may be wired such that current will flow in a first direction around the first fluid conduit 62 and the second part 60b may be wired such that current will flow in a second, opposite direction around the first fluid conduit. Alternatively, the first part 60a may be wired such that current will flow in a first direction around the first fluid conduit 62 and the second part 60b may also be wired such that current will flow in the first direction around the first fluid conduit.

Further, the first part 60a of the first coil 60 may generate a first electromagnetic field in a first direction and the second part 60b of the first coil may generate a second electromagnetic field in a second direction opposite the first direction. Alternatively, the first part 60a of the first coil 60 may generates a first electromagnetic field in the first direction and the second part 60b of the first coil may also generate a second electromagnetic field in the first direction. The direction of the fields may be controlled by either the winding direction or the wiring of the coils.

As illustrated in FIG. 2, the first part 60a of the first coil 60 may be spaced from the second part 60b on the first fluid conduit 62. Alternatively, the second part 60b may abut or overlap the first part 60a on the first fluid conduit 62, depending on the electromagnetic fields that are sought to be generated, or the first part 60a and the second part 60b may be placed on different fluid conduits.

The second coil 70, as mentioned above, may include the first part 70a and the second part 70b which can be wound, wired, and have electromagnetic fields generated in each of the directions and permutations as set forth for the parts of the first coil 60.

Figure 3:
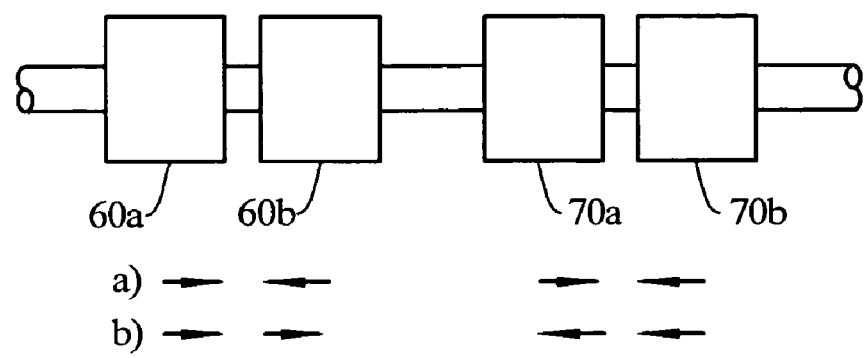
FIG. 3 is a schematic illustration of arrangements and orientations for the inductor coils of FIG. 2.

Examples of some permutations of the fields to be generated are illustrated in FIG. 3. In one orientation, as indicated by line a), the fields of the first part 60a and the second part 60b of the first coil 60 are opposed to one another, as are the fields of the first part 70a and the second part 70b of the second coil. In line b), the fields of the first part 60a and the second part 60b of the first coil 60 are oriented in the same direction as the other, as are the fields of the first part 70a and the second part 70b of the second coil, however the field direction of the first coil is opposite the direction of the field of the second coil. Since each part of each coil can have it's field oriented in either of two directions, the remaining permutations of orientations of the field directions will be readily apparent to a person of skill in the art.

Figure 4:
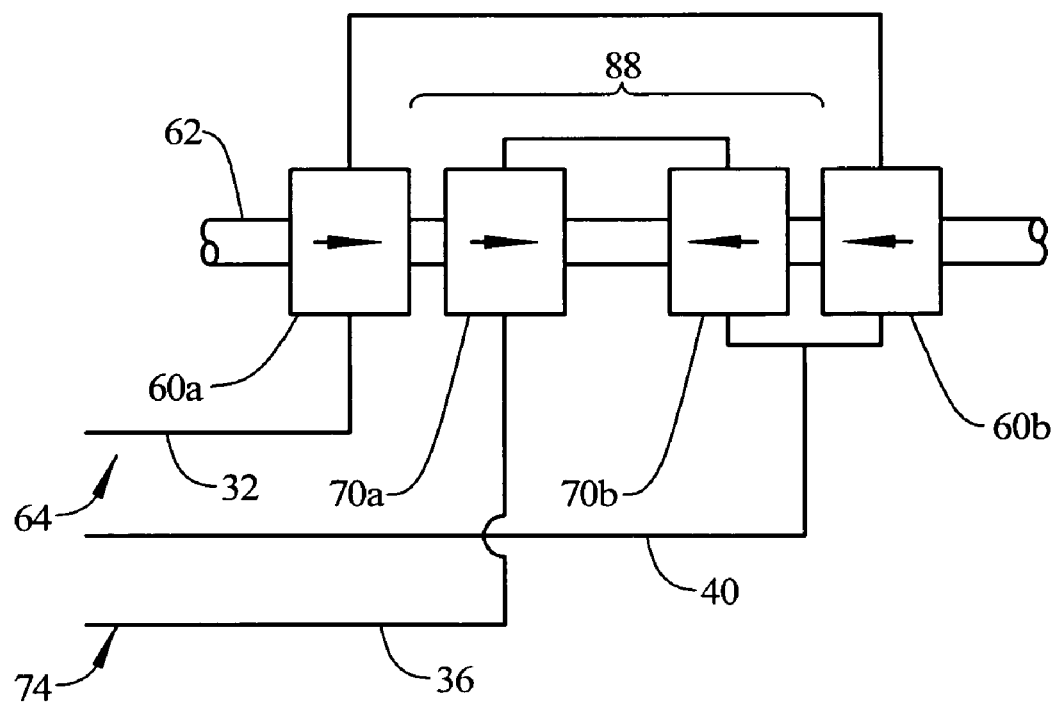
FIG. 4 is a schematic illustration of a particular arrangement and orientation for the inductor coils FIG. 2.

As illustrated in FIG. 4, another embodiment is to have the first 70a and second 70b parts of the second coil 70 wound on the first fluid conduit 62 in a space 88 between the first 60a and second 60b parts of the first coil 60. This will allow for the same permutations of field orientations as described above, however, the effects may be somewhat different due to the alternating arrangement of the two circuits 64 and 74. Each of the parts of the coils may be separated from each other, or some or all of the parts may be abutting or overlapping with adjacent coil parts. In the embodiment illustrated, the first part 60a of the first coil 60 and the first part of the second coil 70 have their fields oriented in the same direction as each other and the second part of the second coil and the second part of the first coil have their fields oriented in the same direction as each other, but opposite to the orientation of the fields of the first parts.

Still other orientations and arrangements of the fields and parts of the coils may be provided, such as alternating the first and second parts of the two coils, rather than putting the entire second coil 70 in the space 88 between the two parts 60a, 60b of the first coil 60 as illustrated in FIG. 4, as well as providing more than two parts for each coil.

Figure 5:
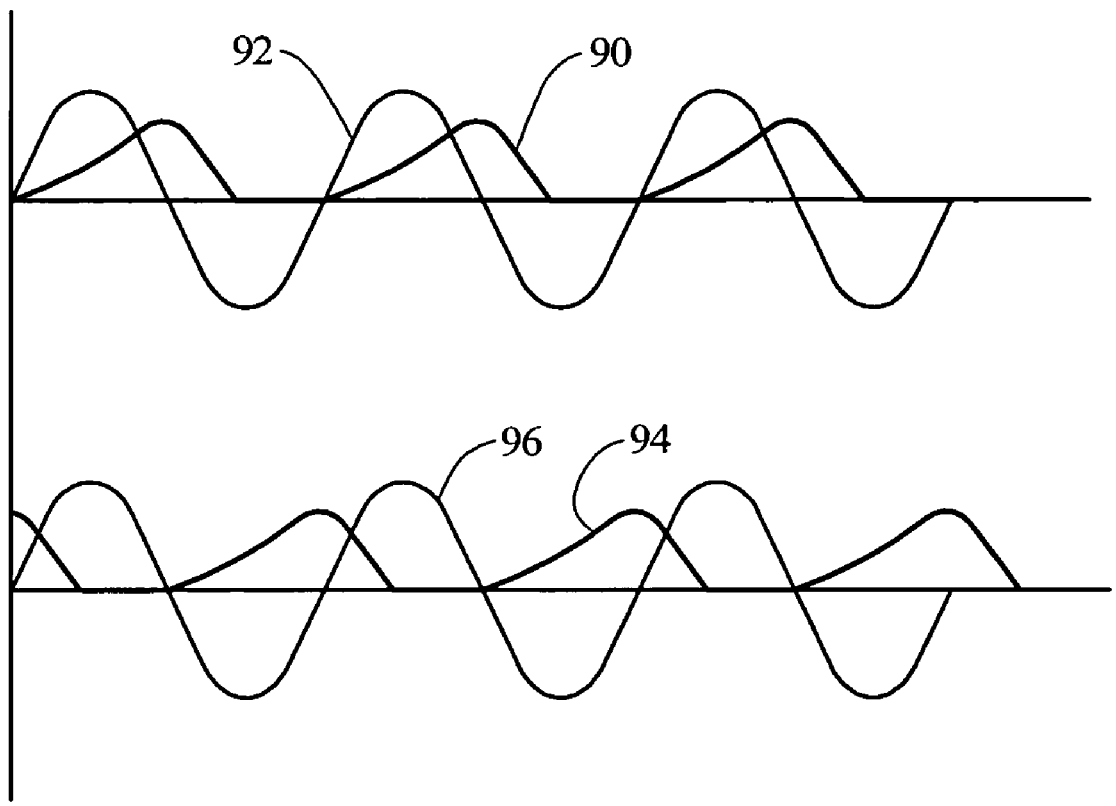
FIG. 5 is a voltage and current vs. time illustration for the inductor coils of FIG. 1.

FIG. 5 illustrates, in the upper part of the figure, the current that is directed through the first coil 60 at line 90 as compared to the AC voltage indicated by line 92. In the lower part of the figure, there is illustrated the current that is directed through the second coil 70 at line 94 as compared to the AC voltage indicated by line 96. Overlaying these two curves demonstrates that current, and hence power, is being supplied to the coils of the system at all times, and is not limited to only part of the overall alternating cycle. Although these curves illustrate an arrangement where the supply of current in each coil is controlled by detecting a zero crossing event of the voltage, other voltage levels or other parameters, such as a pulse from a microcomputer clock, could be selected for controlling the current flow to each coil.

Figure 6:
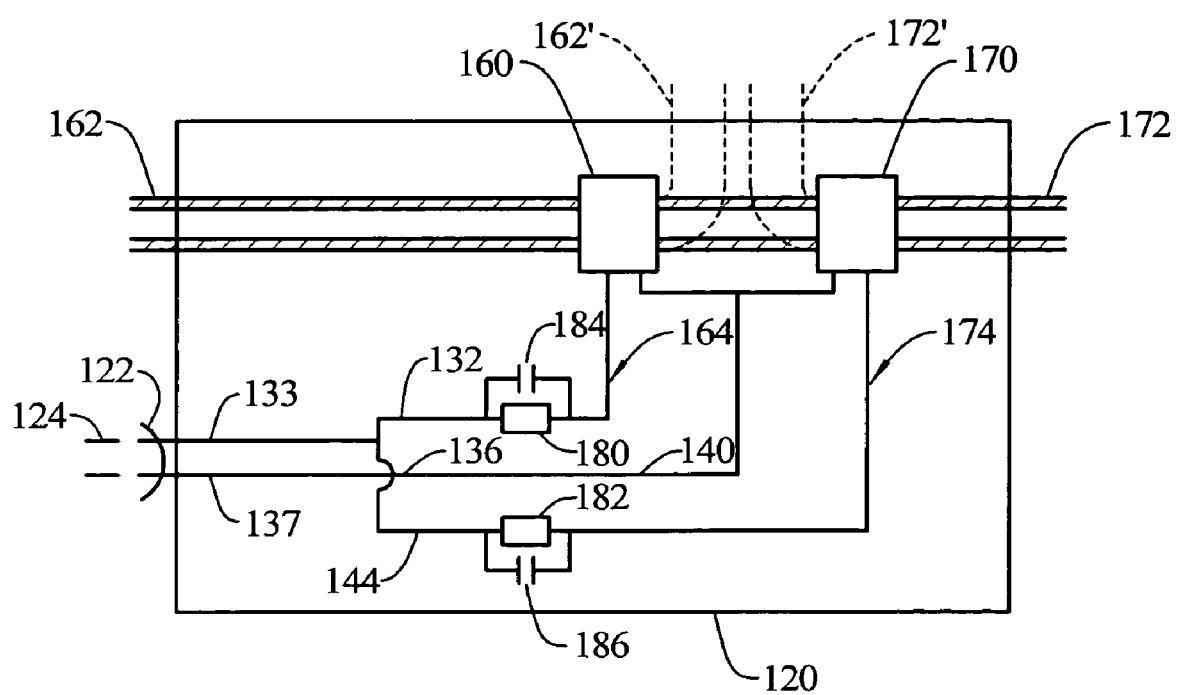
FIG. 6 is a schematic electrical diagram of a further embodiment of the invention.

FIG. 6 illustrates another embodiment of the present invention which does not necessarily utilize a transformer or the specific circuit elements shown in FIGS. 1-4 for initiating a high frequency electromagnetic field. In this embodiment, a fluid treatment device 120 is provided for being connected via a plug 122 or other electrical connection, such as a direct hard wired connection, to a source of AC power 124 having an AC wave form with a maximum voltage. The source of AC power might typically be an electrical line supplied by a power company, in which the voltage supplied oscillates between a maximum positive voltage and a maximum negative voltage, with an alternating current. Usually in the United States, power companies supply alternating current electricity which alternates at a rate of 60 times per second, and in Europe and other parts of the world, power is supplied at an alternating current rate of 50 times per second. The present invention is contemplated to be able to operate at either of these rates, or other alternating rates that may be provided by various types of power supply devices or other electrical devices.

The source of AC power 124 may also be the output side of a transformer, with the voltage and current being selected and adjusted in accordance with the demands of the fluid treatment device 120. A first electrical conductor 132 is electrically connected to a first electrical conductor 133 of the AC power source 24. A second electrical conductor 136 is electrically connected to a second electrical conductor 137 of the AC power source 124. A third electrical conductor 140 is also electrically connected to the first electrical conductor 133 of the AC power source 24.

As schematically illustrated in FIG. 6, a first electromagnetic field generating device 160 is positioned adjacent to a first fluid conduit 162 and is electrically connected to the first 132 and third 140 electrical conductors to form a first circuit 164. In this context, the term adjacent is meant to mean an area where the electromagnetic field generated by the electromagnetic generating device 160 will effectively pass through the first fluid conduit 162 so as to have an effect on the fluid flowing in the conduit. The first electromagnet field generating device 160 may be a current carrying electrical conductor, such as a wire, wrapped around or abutting the first fluid conduit 162.

A second electromagnetic field generating device 170 is positioned adjacent to a second fluid conduit 172 and is electrically connected to the second 136 and third 140 electrical conductors to form a second circuit 174. The second electromagnet field generating device 170 may be a current carrying electrical conductor, such as a wire, wrapped around or abutting the second fluid conduit 172.

The second fluid conduit 172 may be separate and distinct from the first fluid conduit 162 as indicated by the phantom lines 162' and 172', or the two conduits may be one in the same.

FIG. 6 further shows a first circuit element 180 provided in the first circuit 64 for initiating a high frequency electromagnetic field at the first electromagnetic field generating device 160 during a first half of the AC wave form. In an embodiment, the first circuit element 180 may be a rectifier, such as a diode. The first circuit element 180 may also be another type of rectifier device, such as a triode, a switch arranged to open or close based on a zero (or other voltage) crossing of the current (including microprocessor controlled switches), or other known types of circuit devices. The use of such a first circuit element 180 causes the first electromagnetic field generating device 160 to ring at a relatively high frequency, providing the benefits of treating the fluid in the conduit 162 as described in U.S. Pat. Nos. 5,702,600; 6,063,287 and 6,146,526.

A second circuit element 182 is provided in the second circuit 174 for initiating a high frequency electromagnetic field at the second electromagnetic field generating device 170 during a second half of the AC wave form. In an embodiment, the second circuit element 182 may be a rectifier, such as a diode. The second circuit element 182 may also be another type of rectifier device, such as a triodes, a switch arranged to open or close based on a zero (or other voltage) crossing of the current (including microprocessor controlled switches), or other known types of circuit devices. The second circuit element 182 provides the same ringing result of the second electromagnetic field generating device 170 as the first circuit element 180 provides for the first electromagnetic field generating device 160.

In various embodiments as described above with reference to FIGS. 1-4, the first electromagnetic field generating device 160 may be spaced from the second electromagnetic field generating device 170 on the first fluid conduit 162, the first electromagnetic field generating device 160 may abut the second electromagnetic field generating device 170 on the first fluid conduit 162, or the second electromagnetic field generating device 170 may at least partially overlap the first electromagnetic field generating device 160 on the first fluid conduit 162.

The electromagnetic field generating devices 160, 170 may be coils that are wired, wrapped and positioned in the various configurations described above for the first coil 60 and second coil 70.

FIG. 6 illustrates that in an embodiment, the first circuit 164 may include a capacitor 184 connected in parallel with the first circuit element 180. Such a capacitor may include any type of capacitive device that can be used to store electrical charge. The size or capacity of the capacitor 184 can be selected to have a desired effect on changing the ringing frequency of the first electromagnetic field generating device 160.

In an embodiment, the second circuit 174 may also include a capacitor 186 connected in parallel with the second circuit element 182. Such a capacitor may be similar to capacitor 184 which may be used in the first circuit 164.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A fluid treatment device for being connected to a source of AC power having an AC wave form, comprising:
   a first electromagnetic field generating device in a first circuit positioned adjacent a first fluid conduit,
   a second electromagnetic field generating device in a second circuit positioned adjacent a second fluid conduit,
   a circuit element in said first circuit for initiating a high frequency electromagnetic field at said first electromagnetic field generating device resulting from a first half of the AC wave form, and
   a circuit element in said second circuit for initiating a high frequency electromagnetic field at said second electromagnetic field generating device resulting from a second half of the AC wave form.

2. A fluid treatment device according to claim 1, wherein said second fluid conduit is said first fluid conduit.

3. A fluid treatment device according to claim 2, wherein said first electromagnetic field generating device is spaced from said second electromagnetic field generating device on said first fluid conduit.

4. A fluid treatment device according to claim 2, wherein said first electromagnetic field generating device abuts said second electromagnetic field generating device on said first fluid conduit.

5. A fluid treatment device according to claim 2, wherein said second electromagnetic field generating device at least partially overlaps said first electromagnetic field generating device on said first fluid conduit.

6. A fluid treatment device according to claim 2, wherein said first electromagnetic field generating device generates a first electromagnetic field within said conduit in a first direction and said second electromagnetic field generating device generates a second electromagnetic field in a second direction within said conduit opposite said first direction.

7. A fluid treatment device according to claim 2, wherein said first electromagnetic field generating device generates a first electromagnetic field within said conduit in a first direction and said second electromagnetic field generating device generates a second electromagnetic field within said conduit also in said first direction.

8. A fluid treatment device according to claim 1, wherein said first fluid conduit and said second fluid conduit are separate and distinct from one another.

9. A fluid treatment device according to claim 1, wherein said first and second circuit elements include a switch element.

10. A fluid treatment device according to claim 1, wherein said first and second circuits respectively also include a capacitor connected in parallel with said first and second circuit elements.

11. A fluid treatment device according to claim 1, wherein said first electromagnetic field generating device is formed in at least a first part and a second part on said first fluid conduit.

12. A fluid treatment device according to claim 11, wherein said first part is spaced from said second part on said first fluid conduit.

13. A fluid treatment device according to claim 11, wherein said first part of said first electromagnetic field generating device generates a first electromagnetic field within said conduit in a first direction and said second part of said first electromagnetic field generating device generates a second electromagnetic field within said conduit in a second direction opposite said first direction.

14. A fluid treatment device according to claim 11, wherein said first part of said first electromagnetic field generating device generates a first electromagnetic field within said conduit in a first direction and said second part of said first electromagnetic field generating device generates a second electromagnetic field within said conduit also in said first direction.

15. A fluid treatment device according to claim 11, wherein said second conduit is said first conduit and said second electromagnetic field generating device is formed in at least a first part and a second part on said first fluid conduit.

16. A fluid treatment device according to claim 15, wherein said first part of said second electromagnetic field generating device is spaced from said second part of said second electromagnetic field generating device on said first fluid conduit.

17. A fluid treatment device according to claim 15, wherein said first part of said second electromagnetic field generating device generates a first electromagnetic field within said conduit in a first direction and said second part of said second electromagnetic field generating device generates a second electromagnetic field within said conduit in a second direction opposite said first direction.

18. A fluid treatment device according to claim 15, wherein said first part of said second electromagnetic field generating device generates a first electromagnetic field within said conduit in a first direction and said second part of said second electromagnetic field generating device generates a second electromagnetic field within said conduit also in said first direction.

19. A fluid treatment device according to claim 15, wherein said first and second parts of said second electromagnetic field generating device are arranged at said first fluid conduit in a space between said first and second parts of said first electromagnetic field generating device.

20. A fluid treatment device according to claim 1, wherein said first electromagnetic field generating device comprises a coiled electrical conductor.

21. A fluid treatment device according to claim 1, wherein said circuit element in said first circuit comprises a circuit element that allows passage of current in a first direction in said first circuit and substantially prevents passage of current in a second direction in said first circuit.

22. A fluid treatment device according to claim 1, including:
a transformer connected to said source of AC power at a primary transformer coil to provide an alternating current flow at a secondary transformer coil;
a first electrical conductor electrically connected to a first point on said secondary coil,
a second electrical conductor electrically connected to a second point on said secondary coil spaced from said first point,
a third electrical conductor electrically connected to a third point on said secondary coil intermediate said first and second points,
said first electromagnetic field generating device being electrically connected to said first and third electrical conductors to form said first circuit,
said second electromagnetic field generating device being electrically connected to said second and third electrical conductors to form said second circuit.

23. A fluid treatment device for being connected to a source of AC power having a maximum voltage, comprising:
a transformer connected to said source of AC power at a primary transformer coil to provide an alternating current flow at a secondary transformer coil,
a first electrical conductor electrically connected to a first point on said secondary coil,
a second electrical conductor electrically connected to a second point on said secondary coil spaced from said first point,
a third electrical conductor electrically connected to a third point on said secondary coil intermediate said first and second points,
a first coil wrapped around a first fluid conduit and being electrically connected to said first and third electrical conductors to form a first circuit,
a second coil wrapped around a second fluid conduit and being electrically connected to said second and third electrical conductors to form a second circuit,
a first circuit element in said first circuit to allow passage of current in a first direction in said circuit and to substantially prevent passage of current in a second direction in said circuit, and
a second circuit element in said second circuit to allow passage of current in said second direction in said circuit and to substantially prevent passage of current in said first direction in said circuit.

24. A fluid treatment device according to claim 22, wherein said first, second and third points are arranged such that substantially identical current flow is provided in said first and second circuits.

25. A fluid treatment device for being connected to a source of AC power having a maximum voltage, comprising:
a transformer connected to said source of AC power at a primary transformer coil to provide an alternating current flow at a secondary transformer coil,
a first electrical conductor electrically connected to a first point on said secondary coil,
a second electrical conductor electrically connected to a second point on said secondary coil,
a third electrical conductor electrically connected to a third point on said secondary coil spaced from said first and second points,
a first electromagnetic field generating device positioned adjacent a first fluid conduit and being electrically connected to said first and third electrical conductors to form a first circuit,
a second electrical field generating device positioned adjacent a second fluid conduit and being electrically connected to said second and third electrical conductors to form a second circuit,
a first circuit element in said first circuit to allow passage of current in a first direction in said circuit and to substantially prevent passage of current in a second direction in said circuit, and a second circuit element in said second circuit to allow passage of current in said second direction in said circuit and to substantially prevent passage of current in said first direction in said circuit.

26. A fluid treatment device according to claim 25, wherein said first and second points are identical.

27. A fluid treatment device according to claim 25, wherein said first and second points are spaced from one another and said third point is located intermediate said first and second points.

28. A fluid treatment device according to claim 25, wherein said first part of said first coil and said first part of said second coil generate electromagnetic fields within said conduit in a first direction and said second part of said first coil and said second part of said second coil generate electromagnetic fields within said conduit in a second direction opposite to said first direction.

29. A fluid treatment device according to claim 25, wherein said first electromagnetic field generating device and said second electromagnetic field generating device respectively comprise a first coil wrapped around said first fluid conduit and a second coil wrapped around said second fluid conduit.

* * * * *